United States Patent
Kato

(10) Patent No.: US 7,011,899 B2
(45) Date of Patent: Mar. 14, 2006

(54) MAGNETIC RECORDING LAYER

(75) Inventor: Kazuo Kato, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/930,899

(22) Filed: Sep. 1, 2004

(65) Prior Publication Data

US 2005/0053804 A1    Mar. 10, 2005

(30) Foreign Application Priority Data

Sep. 4, 2003    (JP) .................... P. 2003-312813

(51) Int. Cl.
*G11B 5/735*    (2006.01)

(52) U.S. Cl. .................. 428/845.2; 428/845.5; 428/847.7

(58) Field of Classification Search ............ 428/845.2, 428/845.5, 847.7
See application file for complete search history.

(56) References Cited

U.S. PATENT DOCUMENTS

| | | | | |
|---|---|---|---|---|
| 5,252,388 A * | 10/1993 | Murooka et al. | ............ | 428/328 |
| 6,645,648 B1 * | 11/2003 | Doushita et al. | ......... | 428/845.5 |
| 6,800,356 B1 * | 10/2004 | Inoue | ...................... | 428/845.1 |
| 6,805,942 B1 * | 10/2004 | Doushita et al. | ......... | 428/844.8 |
| 6,835,438 B1 * | 12/2004 | Ejiri et al. | ............... | 428/845.5 |

FOREIGN PATENT DOCUMENTS

JP    5-182178 A    7/1993

* cited by examiner

*Primary Examiner*—Stevan A. Resan
(74) *Attorney, Agent, or Firm*—Sughrue Mion, PLLC

(57) ABSTRACT

A magnetic recording medium comprising a backcoating layer, a support, and a magnetic layer containing ferromagnetic powder, the backcoating layer having 800 to 1500 projections of 50 nm or more and less than 75 nm in height per 6400 $\mu m^2$ and 600 or less projections of 75 nm or more in height per 6400 $\mu m^2$.

14 Claims, No Drawings

MAGNETIC RECORDING LAYER

FIELD OF THE INVENTION

This invention relates to a magnetic recording medium and more particularly a magnetic recording medium having a reduced error rate, a reduced frictional coefficient, and good tape pack quality by virtue of its improved backcoating layer.

BACKGROUND OF THE INVENTION

In line with the increasing capacity of magnetic recording media, the data transfer speed in VTRs and computer drives has been increased by raising the relative running speed of a magnetic recording medium with respect to a magnetic head. Improvement on recording density is indispensable for achieving high capacity, and magnetic recording media with excellent electromagnetic characteristics have been demanded.

Very fine and highly coercive ferromagnetic metal powder and hexagonal ferrite powder have been used in pursuit for improved recording density.

Further increased recording density has been sought by reducing the thickness of a magnetic layer formed of such fine, high-coercivity ferromagnetic powder thereby minimizing read output reduction caused by thickness loss. For example, JP-A-5-182178 discloses a magnetic recording medium having a substrate, a non-magnetic lower layer containing inorganic powder dispersed in a binder, and a magnetic upper layer having a thickness of 1.0 $\mu$m or smaller and containing ferromagnetic powder dispersed in a binder, the magnetic upper layer having been formed while the non-magnetic lower layer is wet. These technologies have introduced various magnetic recording tapes with such a dual layer structure, including those for computers such as DLT IV, DDS3, DDS4, LTO, SDLT, and DTF2 formats, and those for broadcast such as a DVC pro format.

Approaches to high capacity and high density magnetic recording media include developing novel fine magnetic powder, optimizing the dual layer structure, optimizing magnetic characteristics, and smoothing the magnetic layer surface. From the aspect of magnetic recording derives, studies on shortening of recording wavelength for increasing recording density have been conducted with the focus on a magnetic recording head. An inductive magnetic head for reproduction relying on electromagnetic induction should have an increased number of coil turns in order to obtain an increased read output. However, this causes an increase in inductance and an increase in resistance in the high frequency region, which eventually results in reduction of read output. Therefore, there is a limit in reachable recording density with an inductive magnetic head.

On the other hand, a head for reading based on magnetoresistive effects, i.e., a magnetoresistive (MR) head has now come to be used on hard disks, etc. An MR head provides a few times as much output as an inductive head. Having no inductive coil, an MR head achieves great reduction of noise created by equipment, such as impedance noise, to bring about improvement on high density recording and reproduction characteristics. Therefore, an MR head, being promising for improvement on high-density recording reproduction, has been steadily extending its application in computer drives including linear tape-open (LTO) drives.

In an attempt to bring out the potential of a drive equipped with an MR head, the inventors of the present invention have hitherto studied smoothing the surface of a magnetic layer by, for example, designing a proper magnetic layer formulation or developing a smooth substrate or optimizing calendering conditions. However, when a magnetic recording tape with a backcoating layer is stored or handled for processing in form of a tape pack (roll) wound on a hub, the surface roughness profile of the backcoating layer can imprint itself in the magnetic layer under compressive force exerted in the normal directions of the roll. Such an imprint has now turned out to cause deterioration in S/N characteristics or increased error rates. To overcome the roughness imprint problem, it has been attempted to smoothen the backcoating layer surface, but back side smoothening results in increased friction and poor tape pack wind quality in a running test.

SUMMARY OF THE INVENTION

An object of the present invention is to provide a magnetic recording medium having an improved backcoating layer, with which the medium has a reduced error rate, can be rewound properly into a good tape pack, and exhibits excellent sliding characteristics.

The present invention relates to a magnetic recording medium having a support, a magnetic layer containing ferromagnetic powder provided on one side of the support, and a backcoating layer provided on the other side of the support. The backcoating layer has 800 to 1500 projections of 50 nm or more and less than 75 nm in height and 600 or less projections of 75 nm or more in height both per 6400 $\mu m^2$.

The present invention embraces in its scope the following preferred embodiments of the above-defined magnetic recording medium.

1) The ferromagnetic powder is ferromagnetic metal powder having an average length of 30 to 150 nm with a coefficient of length variation of 25% or smaller.
2) The ferromagnetic metal powder mainly comprises Fe, contains 10 to 40 atom % of Co, 2 to 20 atom % of Al, and 1 to 15 atom % of Y each based on Fe, and has a coercive force of 2000 to 3000 Oe (160 to 240 kA/m) and a saturation magnetization $\sigma$s of 80 to 160 mT.
(3) The ferromagnetic powder is ferromagnetic hexagonal ferrite powder having an average diameter of 5 to 40 nm with a coefficient of diameter variation of 10 to 25%.
(4) The ferromagnetic hexagonal ferrite powder has a coercive force of 2000 to 3000 Oe (160 to 240 kA/m) and a saturation magnetization $\sigma$s of 40 to 80 mT.
(5) The magnetic layer has a thickness of 40 to 200 nm.
(6) The magnetic recording medium is a magnetic tape for digital recording applied to a recording and reproduction system having an MR head.

By controlling the densities of projections of specific height ranges on the backcoating layer, a magnetic recording medium having a reduced frictional coefficient, good tape pack quality, and a reduced error rate is obtained.

DETAILED DESCRIPTION OF THE INVENTION

The present invention relates to a magnetic recording medium having at least a support, a magnetic layer on one side of the support, and a backcoating layer on the other side of the support. The backcoating layer has, on its outer surface, 800 to 1500, preferably 900 to 1450, still preferably 950 to 1400, projections having a height of 50 nm or more and less than 75 nm per 6400 $\mu m^2$ and 600 or less, preferably 550 or less, still preferably 500 or less, projections having a height of 75 nm or greater per 6400 $\mu m^2$.

As long as the density of projections having a height of 50 nm or more and less than 75 nm falls within the recited range, the backcoating layer has a reduced frictional coefficient so that the magnetic tape exhibits stable running properties and is rewound into a neat tape pack.

If the density of projections of 50 nm or higher and lower than 75 nm is smaller than 800/6400 $\mu m^2$, the backcoating layer will have an increased frictional coefficient. As a result, the tape exhibits unstable running. Besides, entrapment of air between strands of tape while being wound is very small. It follows that the tape is wound so tightly as to deform the hub and as to deform the tape pack to a parabolic shape. If, on the other hand, that density exceeds 1500/6400 $\mu m^2$, the frictional coefficient decreases, and the air entrapment between strands of tape increases. As a result, when the entrapped air escapes from between the strands during winding, the strand can pop out as a reaction. Such a step winding would suffer from edge damage when some outer force is applied to the tape cartridge, for example, if the tape cartridge is dropped, which results in an increase of errors.

As long as the density of projections of 75 nm or higher is limited to 600/6400 $\mu m^2$ at the most, the adverse influences of the roughness transfer to the magnetic layer are suppressed to minimize the error rate. It is desirable in principle that the number of such high projections be as small as possible.

The projection densities on the backcoating layer can be so controlled as specified in the invention by various means. The means include adjusting particle sizes of inorganic particles such as carbon black and abrasives, selecting the kinds of the binder for dispersing the inorganic particles and the lubricant, selecting the kneading and/or dispersing conditions in the preparation of a coating composition for the backcoating layer, selecting the backcoating layer thickness, and controlling coating and drying conditions, calendering conditions, and backcoating layer surface finishing conditions.

Carbon black that can be used in the backcoating layer is usually a combination of fine particles with an average particle size of 17 to 50 nm and coarse particles with an average particle size of 75 to 300 nm. Only fine particles of carbon black may be used alone. The fine carbon black particles are effective in reducing the surface resistivity of the backcoating layer and contributory to formation of micro projections. The coarse carbon black particles form relatively large projections, making contribution to reduction in contact area and reduction in frictional coefficient. Note that coarse carbon black particles added too much can result in excessive projections of 75 nm or higher. Moreover, coarse carbon black particles tend to fall off the backcoating layer under some tape running conditions, which can result in increased error rates.

Examples of commercially available carbon blacks having an average particle size of 50 nm or smaller include RAVEN 2000 (average particle size (hereinafter the same): 18 nm), RAVEN 1500 (17 nm), RAVEN 1000 (24 nm), and RAVEN 860 ULTRA (39 nm) from Columbian Carbon; BP800 (17 nm), REGAL 330 (25 nm), REGAL 250 (34 nm), and REGAL 99 (38 nm) from Cabot Corp.; and #40 (24 nm), and #95 (40 nm) from Mitsubishi Chemical Corp. Examples of commercially available carbon blacks having an average particle size of 75 to 300 nm include Asahi #50 (80 nm) and Asahi #51 (85 nm) from Asahi Carbon Co.; Seast SPSRF-LS (95 nm) and Seast TA FT class (122 nm) from Tokai Carbon Co., Ltd.; RAVEN 450 (75 nm) and RAVEN 410 (101 nm) from Columbian Carbon; and Thermal Black (270 nm) from Cancarb Ltd. Carbon blacks having an average particle size of 75 to 300 nm can be chosen from carbon blacks for rubbers or colors.

The fine carbon black particles having an average particle size of 17 to 50 nm and the coarse carbon black particles having an average particle size of 75 to 300 nm are preferably used at a weight ratio of 98:2 to 75:25, still preferably 97:3 to 85:15.

The total carbon black content in the backcoating layer is usually 30 to 70% by weight, preferably 40 to 60% by weight, based on the total solids content.

The inorganic powder, except carbon black, that can be used in the backcoating layer includes those having an average particle size of 80 to 250 nm and a Mohs hardness of 5 to 9. The inorganic powder for use in the backcoating layer can be chosen from among those used as non-magnetic powder or abrasives in the non-magnetic lower layer described later. Inter alia, α-iron oxide or α-alumina is preferred.

The inorganic powder content in the backcoating layer is preferably 3 to 40 parts by weight, still preferably 5 to 30parts by weight, per 100 parts by weight of a binder hereinafter described. The backcoating layer is basically made up the above-described carbon black and inorganic powder dispersed in a binder. The backcoating layer preferably contains a dispersant, a lubricant, and other arbitrary components.

Suitable dispersants include fatty acids having 8 to 18 carbon atoms, such as lauric acid, caprylic acid, myristic acid, palmitic acid, stearic acid, oleic acid, linoleic acid, and elaidic acid; copper oleate, copper phthalocyanine, barium sulfate, and basic organic dye compounds. These dispersants can be used either individually or as a combination thereof. Preferred of them are copper oleate, copper phthalocyanine, barium sulfate, and basic organic dye compounds.

The lubricant that can be used in the backcoating layer is chosen from those commonly used in magnetic tapes. Fatty acids having 18 or more carbon atoms or fatty acid esters are preferred for improving running properties. The lubricant is usually used in an amount of 1 to 5 parts by weight per 100 parts by weight of a binder resin.

The backcoating layer is provided on a side of a support opposite to the magnetic layer side in a conventional manner. That is, a coating composition prepared by dissolving and dispersing the aforementioned components in an appropriate organic solvent is applied to a support and dried in a usual manner to form a backcoating layer.

Surface projections on the backcoating layer are divided into those originated in the surface profile of the support and those originated in the coating layer. A support generally contains an organic or inorganic filler. The projections formed by the filler are, while smoothed to some extent by the backcoating layer, transmitted to the surface of the backcoating layer to form small surface projections. The number of projections on the backcoating layer ascribed to the filler can be varied by changing the size and amount of the filler incorporated into the support. The influence of the projections on the support can be lessened by increasing the thickness of the backcoating layer, thereby to reduce the projections on the backcoating layer.

The inorganic powder used in the backcoating layer becomes less dispersible and readier to form projections as its particle size decreases. The disperse state of powder also depends on the binder to be combined with. In preparing the coating composition of the backcoating layer, when the components are strongly kneaded with a reduced amount of a solvent, the blend is difficult to disperse, and the projections tend to increase. When the kneading is gentle with an increased amount of a solvent, or the components are directly dispersed without being kneaded, the projections tend to decrease. Dispersing conditions include the dispersing time and the hardness and specific gravity of a dispersing medium used in sand mill dispersing. The projections increase with reduction of dispersing time. In general, the projections can be reduced by extending the dispersing time.

Stricter calendering conditions (e.g., pressure, temperature, roll hardness, speed, etc.) generally result in reduced projections.

The surface finish of the backcoating layer includes burnishing with an abrasive tape or a diamond wheel. The surface projections can also be controlled by selecting the grit number and the contact pressure of the abrasive tape or diamond wheel.

Thus, there are many methods for controlling the surface projections of the backcoating layer, from which proper means should be selected and combined properly to accomplish the performance required of a particular magnetic recording medium.

The magnetic layer preferably has a three-dimensional mean surface roughness Sa of 3.0 nm or less. The magnetic layer preferably has a thickness of 40 to 200 nm, more preferably 50 to 150 nm. The magnetic layer may have a single layer or a multilayer structure. A suitable thickness is designed for the intended recording/reproduction system. In general, a smaller thickness than 40 nm tends to fail to produce a sufficient output and a satisfactory C/N ratio, and a larger thickness than 200 nm tends to result in increased noise and a reduced C/N ratio.

The average thickness of the magnetic layer can be measured as follows. A magnetic recording medium having a dual layer structure composed of a non-magnetic layer (hereinafter sometimes referred to as a lower layer) and a magnetic layer (hereinafter sometimes referred to as an upper layer) is taken for instance. In accordance with the well-known ultra-thin section analysis, a micrograph (×50000) is taken of an ultra-thin section (about 80 nm thick) cut from the medium along the thickness direction with a transmission electron microscope. The magnetic layer surface and the upper layer/lower layer interface on the micrograph are traced on a transparent film. Five hundred straight lines parallel to the thickness direction are drawn between the traced two lines at an interval of 0.025 $\mu$m. The average of the lengths of the straight lines is taken as an average thickness of the magnetic layer.

The surface properties of the magnetic layer can be controlled by adjusting particle sizes of the components in the upper layer (i.e., magnetic powder, abrasive, carbon black, etc.) and the inorganic powders used in the lower layer (i.e., non-magnetic powder, abrasive, carbon black, etc.), selecting the kinds of binders for dispersing these powders and lubricants, selecting the kneading and/or dispersing conditions in the preparation of coating compositions for the upper and lower layers, selecting the thickness of the upper and lower layers, and controlling coating and drying conditions, calendering conditions, and magnetic layer surface finishing conditions.

The magnetic powder and the inorganic powders become less dispersible and readier to provide surface asperities as their particle size decreases. The disperse state, which affects the surface properties, also depends on the binder to be combined with. In preparing the coating compositions of the upper and lower layers, when the components are strongly kneaded with a reduced amount of a solvent, the blend is difficult to disperse, and the surface tends to have asperities. When the kneading is gentle with an increased amount of a solvent, the surface tends to become smooth. Dispersing conditions include the dispersing time and the hardness and specific gravity of a dispersing medium used in sand mill dispersing. The projections increase with reduction of dispersing time. In general, the projections can be reduced by extending the dispersing time. However, extension of the dispersing time can be accompanied by contamination of the dispersed particles with wear debris from a dispersing machine or a dispersing media and resultant agglomeration of the particles, which can result in an increase of surface projections.

Stricter calendering conditions (e.g., pressure, temperature, roll hardness, speed, number of nips, etc.) generally result in a smoother surface.

The surface finishing of the magnetic layer includes burnishing with an abrasive tape or a diamond wheel. The surface projections can be controlled by selecting the grit number and the contact pressure of the abrasive tape or diamond wheel. In the case of tape media, the treatments using a lapping tape, a sapphire blade, a diamond wheel, etc. as taught in JP-A-63-259830 are useful. The surface projections can be controlled by selecting the treatment and the conditions for carrying out the treatment. Even where the support or the coating layer have many projections, such a surface treatment reduces the projections of the magnetic layer to provide a smooth surface.

Thus, there are many methods for controlling the surface projections of the magnetic layer, from which proper means should be selected and combined properly to accomplish the performance required of a particular magnetic recording medium.

The ferromagnetic powder that can be used in the magnetic layer includes ferromagnetic metal powder and ferromagnetic hexagonal ferrite powder.

The ferromagnetic metal powder is not limited, provided that Fe is a main component. Ferromagnetic alloys mainly comprising α-Fe are preferred. The ferromagnetic metal powder may further contain Al, Si, S, Sc, Ti, V, Cr, Cu, Y, Mo, Rh, Pd, Ag, Sn, Sb, Te, Ba, Ta, W, Re, Au, Pb, Bi, La, Ce, Pr, Nd, P, Co, Mn, Zn, Ni, Sr, B, etc. Ferromagnetic alloys containing at least one of Al, Si, Ca, Y, Ba, La, Nd, Co, Ni, and B in addition to α-Fe are still preferred. Those containing Co, Al, and Y are particularly preferred. Those containing 10 to 40 atom % of Co, 2 to 20 atom % of Al, and 1 to 15 atom % of Y each based on Fe are especially preferred.

The ferromagnetic metal powder can be pretreated with a dispersant, a lubricant, a surface active agent, an antistatic agent, and the like before being dispersed. The ferromagnetic metal powder may contain a small amount of water, a hydroxide or an oxide. The water content of the ferromagnetic metal powder, which is preferably optimized according to the kind of the binder to be combined with, preferably ranges 0.01 to 2% by weight.

The ferromagnetic metal powder preferably has a crystallite size of 80 to 180 Å, still preferably 100 to 180 Å, particularly preferably 120 to 160 Å. The crystallite size is an average calculated from a half value width of the X-ray diffraction peak by Scherrer's formula. X-Ray diffractometry was carried out using RINT 2000 from Rigaku Co., Ltd. equipped with a CuKα ray source at a tube voltage of 50 kV and a tube current of 300 mA.

The ferromagnetic metal powder preferably has an average length (long axis length) of 30 to 150 nm, still preferably 40 to 100 nm. The recited range of the average particle length is suited for high density magnetic recording because the thermal fluctuation can be reduced to stabilize the magnetization, and the noise is low. The coefficient of variation of particle length is 25% or smaller, preferably 23% or smaller. With a so controlled coefficient of length variation, a narrow coercive force distribution is obtained to bring about improved high density recording performance.

The ferromagnetic metal powder preferably has a BET specific surface area ($S_{BET}$) of at least 30 m$^2$/g and less than 50 m$^2$/g, still preferably 38 to 48 m$^2$/g, so as to secure satisfactory surface properties and low noise.

The pH of the ferromagnetic metal powder, which should be optimized depending on the binder to be used in combination, usually ranges 4 to 12, preferably 7 to 10. If desired, the ferromagnetic metal powder is surface treated with 0.1 to 10% by weight of Al, Si, P or an oxide thereof based on the ferromagnetic metal powder. This surface treatment is effective in reducing the adsorption of lubricants, e.g., fatty acids, onto the surface to 100 mg/m$^2$ or less. The ferromagnetic metal powder may contain inorganic soluble ions, such as Na, Ca, Fe, Ni, and Sr ions. Presence of not more than 200 ppm of such ions is little influential on the characteristics. The void of the ferromagnetic metal powder is preferably as small as possible. The void is preferably 20% by volume or less, still preferably 5% by volume or less.

The ferromagnetic metal powder can have an acicular shape, a tabular shape, a spindle shape, and any other general shapes as long as the particle size falls within the above-recited range. Acicular ferromagnetic metal particles are preferred. Acicular ferromagnetic metal particles preferably have an average aspect ratio of 4 to 12, still preferably 5 to 12.

The ferromagnetic metal powder preferably has a coercive force Hc of 2000 to 3000 Oe (160 to 240 kA/m), still preferably 2100 to 2900 Oe (170 to 230 kA/m), and a saturation magnetization σs of 80 to 170 A·m$^2$/kg, still preferably 90 to 150 A·m$^2$/kg.

The ferromagnetic hexagonal ferrite powder that can be used in the magnetic layer should be of low noise particularly when it is read with an MR head for increasing the track density. The average diameter of the ferromagnetic hexagonal ferrite powder is preferably 5 to 40 nm, still preferably 10 to 35 nm, particularly preferably 15 to 30 nm. The recited range of the average particle diameter is suited for high density magnetic recording because thermal fluctuation can be reduced to stabilize the magnetization, and the noise is low.

The average aspect ratio of the hexagonal ferrite particles is preferably 1 to 15, still preferably 1 to 7. Within that range, sufficient orientation is obtained while securing a sufficient packing density and suppressing noise due to particles' stacking. The particles within the above-recited size range have a BET specific surface area ($S_{BET}$) of 30 to 200 m$^2$/g. The $S_{BET}$ approximately corresponds to a surface area arithmetically calculated from the diameter and the thickness. It is preferred that the particle size (diameter and thickness) distribution be as small as possible. While the size distribution is mostly not normal, the coefficient of diameter variation is 10 to 25%. In order to make the particle size distribution sharper, the reaction system for particle formation is made homogenous as much as possible, or the particles as produced are subjected to treatment for distribution improvement. For example, selective dissolution of ultrafine particles in an acid solution is among known treatments.

Usually, ferromagnetic hexagonal ferrite powders can be designed to have a coercive force Hc of from about 500 to 5000 Oe (40 to 400 kA/m). While a higher coercive force is more advantageous for high-density recording, an upper limit is governed by the ability of a recording head. The coercive force of the hexagonal ferrite powder used in the invention is preferably about 2000 to 3000 Oe (160 to 240 kA/m), still preferably 2200 to 2800 Oe (176 to 224 kA/m). Where the saturation magnetization of the head exceeds 1.4 T, it is desirable that the coercive force of the magnetic powder be 2000 Oe (160 kA/m) or higher. The coercive force can be controlled by the particle size (diameter and thickness), the kind and amount of constituent elements, the substitution site of elements, conditions of particle forming reaction, and the like. The hexagonal ferrite powder preferably has a saturation magnetization σs of 40 to 80 A·m$^2$/kg. A relatively high σs within that range is desirable. A saturation magnetization tends to decrease as the particle size becomes smaller. It is well known that the saturation magnetization can be improved by using a magnetoplumbite type ferrite combined with a spinel type ferrite or by properly selecting the kinds and amounts of constituent elements. It is also possible to use a W-type hexagonal ferrite powder.

It is also practiced to treat ferromagnetic hexagonal ferrite powder to be dispersed with a substance compatible with a dispersing medium and a binder resin. The treating substance includes organic or inorganic compounds. Typical examples are compounds of Si, Al or P, various silane coupling agents, and various titan coupling agents. The treating substance is usually used in an amount of 0.1 to 10% by weight based on the magnetic powder. The pH of the magnetic powder is of importance for dispersibility. The pH value optimum for a dispersing medium or a binder resin can range from about 4 to 12. From the standpoint of chemical stability and storage stability of the magnetic recording medium, a pH of about 6 to 11 is selected. The water content of the magnetic powder is also influential on dispersibility. While varying according to the kinds of the dispersing medium and the binder resin, the optimum water content usually ranges from 0.01 to 2.0% by weight.

The ferromagnetic hexagonal ferrite powder to be used in the invention can be prepared by, for example, (i) a process by controlled crystallization of glass which comprises blending barium oxide, iron oxide, an oxide of a metal that is to substitute iron, and a glass forming oxide (e.g., boron oxide) in a ratio providing a desired ferrite composition, melting the blend, rapidly cooling the melt into an amorphous solid, re-heating the solid, washing and grinding the solid to obtain a barium ferrite crystal powder or (ii) a hydrothermal process which comprises neutralizing a solution of barium ferrite-forming metal salts with an alkali, removing by-products, heating in a liquid phase at 100° C. or higher, washing, drying, and grinding to obtain a barium ferrite crystal powder or (iii) a coprecipitation process which comprises neutralizing a solution of barium ferrite-forming metal salts with an alkali, removing by-products, drying, treating at 1100° C. or lower, and grinding to obtain a barium ferrite crystal powder. In the present invention, ferromagnetic hexagonal barium ferrite is particularly preferred.

Carbon black species that can be used in the upper layer include furnace black for rubber, thermal black for rubber, carbon black for colors, and acetylene black. The carbon black used in the upper layer preferably has a specific surface area of 5 to 500 m$^2$/g, a DBP oil absorption of 10 to 400 ml/100 g, an average particle size of 5 to 300 nm, a pH of 2 to 10, a water content of 0.1 to 10% by weight, and a tap density of 0.1 to 1 g/ml. Specific examples of commercially available carbon black products which can be used in the upper layer include Black Pearls 2000, 1300, 1000, 900, 800 and 700 and Vulcan XC-72 (from Cabot Corp.); #80, #60, #55, #50, and #35 (from Asahi Carbon Co., Ltd.); #2400B, #2300, #900, #1000, #30, #40, and #10B (from Mitsubishi Chemical Corp.); and Conductex SC and RAVEN 150, 50, 40, and 15 (from Columbian Carbon). Carbon black having been surface treated with a dispersant, etc., resin-grafted carbon black, or carbon black with its surface partially graphitized may be used. Carbon black may previously been dispersed in a binder before being added to a coating composition. The above-enumerated carbon black species can be used either individually or as a combination thereof. The carbon black, if added, can be used in an amount of 0.1 to 30% by weight based on the ferromagnetic powder.

Carbon black serves for antistatic control, reduction of frictional coefficient, reduction of light transmission, film strength enhancement, and the like. These functions vary depending on the species. Accordingly, it is understandably possible to optimize the kinds, amounts, and combinations of the carbon black species for each layer according to the intended purpose with reference to the above-mentioned characteristics, such as particle size, oil absorption, conductivity, pH, and so forth. In selecting carbon black species for use in the magnetic layer, reference can be made, e.g., in Carbon Black Kyokai (ed.), *Carbon Black Binran*.

The inorganic powder that can be used in the lower layer is non-magnetic powder including metal oxides, metal carbonates, metal sulfates, metal nitrides, metal carbides, and metal sulfides. Examples are α-alumina having an α-phase content of 90% or more, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. They can be used either individually or in combination. Preferred among them are titanium dioxide, zinc oxide, iron oxide, and barium sulfate, particularly titanium dioxide and α-iron oxide, because they can be produced with small particle size distribution and be endowed with a function through many means.

The non-magnetic powder preferably has an average particle size of 0.005 to 0.5 $\mu$m. If desired, non-magnetic powders different in particle size may be used in combination, or a single kind of a non-magnetic powder having a broadened size distribution may be used to produce the same effect. A still preferred particle size of the non-magnetic powder is 0.01 to 0.2 $\mu$m. In particular, a non-acicular metal oxide preferably has an average particle size of 0.08 $\mu$m or smaller, and an acicular metal oxide preferably has a length of 0.2 $\mu$m or shorter, still preferably 0.15 $\mu$m or shorter, particularly preferably 0.1 $\mu$m or shorter. The non-magnetic powder has an aspect ratio of 2 to 20, preferably 3 to 10. The tap density of the powder is 0.05 to 2 g/ml, preferably 0.2 to 1.5 g/ml. The water content of the non-magnetic powder is 0.1 to 5% by weight, preferably 0.2 to 3% by weight, still preferably 0.3 to 1.5% by weight. The pH of the non-magnetic powder is from 2 to 11. Non-magnetic powder whose pH is between 5.5 and 10 is particularly preferred because it is highly adsorbable by the functional group (described infra) of the binder and therefore well dispersible in the binder and also it imparts mechanical strength to the coating film.

The non-magnetic powder has a specific surface area of 1 to 100 $m^2$/g, preferably 5 to 80 $m^2$/g, still preferably 10 to 70 $m^2$/g. The non-magnetic powder preferably has a crystallite size of 0.004 to 1 $\mu$m, still preferably 0.04 to 0.1 $\mu$m. The DBP oil absorption is 5 to 100 ml/100 g, preferably 10 to 80 ml/100 g, still preferably 20 to 60 ml/100 g. The specific gravity is 1 to 12, preferably 3 to 6. The particle shape may be any of needle-like, spherical, polygonal and tabular shapes. The Mohs hardness is preferably 4 to 10. The SA (stearic acid) adsorption of the non-magnetic powder is in a range of 1 to 20 $\mu$mol/$m^2$, preferably 2 to 15 $\mu$mol/$m^2$, still preferably 3 to 8 $\mu$mol/$m^2$. The pH of the powder is preferably between 3 and 6.

It is preferred that $Al_2O_3$, $SiO_2$, $TiO_2$, $ZrO_2$, $SnO_2$, $Sb_2O_3$, ZnO or $Y_2O_3$ be present on the surface of the non-magnetic powder by surface treatment. Among them, preferred for dispersibility are $Al_2O_3$, $SiO_2$, $TiO_2$, and $ZrO_2$, with $Al_2O_3$, $SiO_2$, and $ZrO_2$ being still preferred. These oxides may be used either individually or in combination. According to the purpose, a composite surface layer can be formed by co-precipitation or a method comprising first applying alumina to the non-magnetic particles and then treating with silica or vise versa. The surface layer may be porous for some purposes, but a homogeneous and dense surface layer is usually preferred.

Carbon black can be incorporated into the non-magnetic lower layer to reduce the surface resistivity and the light transmission, which are well-known effects of carbon black, and also to obtain a desired micro Vickers hardness. Useful carbon black species include furnace black for rubber, thermal black for rubber, carbon black for colors, and acetylene black. The carbon black used in the lower layer has a specific surface area of 100 to 500 $m^2$/g, preferably 150 to 400 $m^2$/g, a DBP oil absorption of 20 to 400 ml/100 g, preferably 30 to 40 ml/100 g, and an average particle size of 5 to 80 nm, preferably 10 to 50 nm, still preferably 10 to 40 nm. The carbon black preferably has a pH of 2 to 10, a water content of 0.1 to 10% by weight, and a tap density of 0.1 to 1 g/ml. Specific examples of commercially available carbon black products which can be used in the lower layer include Black Pearls 2000, 1300, 1000, 900, 800, 880, and 700 and Vulcan XC-72 (from Cabot Corp.); #3050B, #3150B, #3250B, #3750B, #3950B, #4000, and #4010 (from Mitsubishi Chemical Corp.); Conductex SC and RAVEN 8800, 8000, 7000, 5750, 5250, 3500, 2100, 2000, 1800, 1500, 1255, 1250 (from Columbian Carbon); Ketjen Black EC (from Akzo Nobel Chemicals). Carbon black having been surface treated with a dispersant, etc., resin-grafted carbon black, or carbon black with its surface partially graphitized may be used. Carbon black may previously been dispersed in a binder before being added to a coating composition. The above-enumerated carbon black species can be used either individually or as a combination thereof. The carbon black, if added, can be used in an amount of 50% by weight or less based on the above-described inorganic powder and 40% by weight or less based on the total weight of the non-magnetic layer. The above-recited carbon black species can be used either individually or as a combination thereof. In selecting carbon black species for use in the lower layer, reference can be made, e.g., in Carbon Black Kyokai (ed.), *Carbon Black Binran*.

The lower layer can contain organic powder according to the purpose. Useful organic powders include acrylic-styrene resin powders, benzoguanamine resin powders, melamine resin powders, and phthalocyanine pigments. Polyolefin resin powders, polyester resin powders, polyamide resin powders, polyimide resin powders, and polyethylene fluoride resin powders are also usable. Methods of preparing these resin powders include those disclosed in JP-A-62-18564 and JP-A-60-255827.

With respect to the other techniques involved in forming the lower layer, e.g., binder resins, lubricants, dispersants, additives, solvents, and methods of dispersion, the following description as for the magnetic layer applies. In particular, known techniques regarding a magnetic layer can be applied with respect to the kinds and amounts of binder resins, additives and dispersants.

Known technologies relating to a magnetic layer, a non-magnetic layer, and a backcoating layer, particularly known techniques relating to the binders, dispersants, additives, solvents, and methods of dispersion used in the formation of a magnetic layer are applied to the present invention.

Binders that can be used in the invention include conventionally known thermoplastic resins, thermosetting resins and reactive resins, and mixtures thereof. The thermoplastic resins used as a binder usually have a glass transition temperature of −100° to 150° C., a number average molecular weight of 1,000 to 200,000, preferably 10,000 to 100,000, and a degree of polymerization of about 50 to 1000.

Such thermoplastic resins include homo- or copolymers containing a unit derived from vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, a vinyl ether, etc.; polyurethane resins, and various rubber resins. Useful thermosetting or reactive resins include phenolic resins, epoxy resins, thermosetting polyurethane resins, urea resins, melamine resins, alkyd resins, reactive acrylic resins, formaldehyde resins, silicone resins, epoxy-polyamide resins, polyester resin/isocyanate prepolymer mixtures, polyester polyol/polyisocyanate mixtures, and polyurethane/polyisocyanate mixtures. For the details of these resins, *Plastic Handbook*, Asakura Shoten (publisher) can be referred to. Known electron beam (EB)-curing resins can also be used in each layer. The details of the EB-curing resins and methods of producing them are described in JP-A-62-256219. The above-recited resins can be used either individually or as a combination thereof. Preferred resins are a combination of a polyurethane resin and at least one vinyl chloride resin selected from polyvinyl chloride, a vinyl chloride-vinyl acetate copolymer, a vinyl chloride-vinyl acetate-vinyl alcohol copolymer, and a vinyl chloride-vinyl acetate-maleic anhydride copolymer and a combination of the above-described combination and polyisocyanate.

The polyurethane resin includes those of known structures, such as polyester polyurethane, polyether polyurethane, polyether polyester polyurethane, polycarbonate polyurethane, polyester polycarbonate polyurethane, and polycaprolactone polyurethane.

In order to ensure dispersing capabilities and durability, it is preferred to introduce into the above-recited binder resins at least one polar group by copolymerization or through addition reaction, the polar group being selected from —COOM, —SO$_3$M, —OSO$_3$M, —P=O(OM)$_2$, —O—P=O(OM)$_2$ (wherein M is a hydrogen atom or an alkali metal base), —OH, —NR$_2$, —N$^+$R$_3$ (wherein R is a hydrocarbon group), an epoxy group, —SH, —CN, and the like. The amount of the polar group to be introduced is $10^{-1}$ to $10^{-8}$ mol/g, preferably $10^{-2}$ to $10^{-6}$ mol/g.

Examples of commercially available binders that can be used in the invention are VAGH, VYHH, and PKHH (from Union Carbide Corp.); MPR-TA, MPR-TA5, MPR-TAL, MPR-TSN, MPR-TMF, MPR-TS, MPR-TM, and MPR-TAO (from Nisshin Chemical Industry Co., Ltd.); DX83 and 100FD (from Denki Kagaku Kogyo K.K.); MR-104, MR-105, MR110, MR100, MR555, and 400X-110A (from Zeon Corp.); Nipporan N2301, N2302, and N2304 (from Nippon Polyurethane Industry Co., Ltd.); Barnock D-400 and D-210-80, and Crisvon 6109 and 7209 (from Dainippon Ink & Chemicals, Inc.); and Vylon UR-8300, UR-8700, RV530, and RV280 (from Toyobo Co., Ltd.).

The binder is used in the non-magnetic layer and the magnetic layer in an amount of 5 to 50% by weight, preferably 10 to 30% by weight, based on the non-magnetic powder and the magnetic powder, respectively. Where a vinyl chloride resin, a polyurethane resin, and polyisocyanate are used in combination, their amounts are preferably selected from a range of 5 to 30% by weight, a range of 2 to 20% by weight, and a range of 2 to 20% by weight, respectively. In case where head corrosion by a trace amount of released chlorine is expected to occur, polyurethane alone or a combination of polyurethane and polyisocyanate can be used. The polyurethane to be used preferably has a glass transition temperature of −50° to 150° C., still preferably 0° to 100° C., an elongation at break of 100 to 2000%, a stress at rupture of 0.05 to 10 kg/mm$^2$ (0.49 to 98 Mpa), and a yield point of 0.05 to 10 kg/mm$^2$ (0.49 to 98 Mpa).

When the magnetic recording medium has a multilayered structure, the constituent layers can have different binder formulations in terms of the binder content, the proportions of a vinyl chloride resin, a polyurethane resin, polyisocyanate, and other resins, the molecular weight of each resin, the amount of the polar group introduced, and other physical properties of the resins. It is rather desirable to optimize the binder design for each layer. For the optimization, known techniques relating to a non-magnetic/magnetic multilayer structure can be utilized. For example, to increase the binder content of the magnetic layer is effective to reduce scratches on the magnetic layer, or to increase the binder content of the non-magnetic layer is effective to increase flexibility thereby to improve head touch.

The polyisocyanate that can be used in the invention includes tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate. Further included are reaction products between these isocyanate compounds and polyols and polyisocyanates produced by condensation of the isocyanates.

Known abrasives mostly having a Mohs hardness of 6 or higher can be used in the present invention, either individually or as a combination thereof. Such abrasives include α-alumina having an α-phase content of at least 90%, β-alumina, silicon carbide, chromium oxide, cerium oxide, α-iron oxide, corundum, artificial diamond, silicon nitride, titanium carbide, titanium oxide, silicon dioxide, and boron nitride. A composite of these abrasives (an abrasive surface treated with another) is also useful. Existence of impurity compounds or elements, which are sometimes observed in the abrasives, will not affect the effect as long as the content of the main component is 90% by weight or higher. The abrasive preferably has a tap density of 0.3 to 2 g/ml, a water content of 0.1 to 5% by weight, a pH of 2 to 11, and a specific surface area of 1 to 30 m$^2$/g. The abrasive grains may be needle-like, spherical or cubic. Angular grains are preferred for high abrasive performance. As is understandable, the kinds, amounts, and combination of abrasives used in the magnetic and non-magnetic layers can be optimized for each layer according to the purpose. The abrasive may previously be dispersed in a binder before being incorporated into a coating composition.

Additives that can be used in the invention include those producing lubricating effects, antistatic effects, dispersing effects, plasticizing effects, and the like. Such additives include monobasic fatty acids having 8 to 24 carbon atoms, which maybe saturated or unsaturated and straight-chain or branched, and their metal (e.g., Li, Na, K, Cu) salts, saturated or unsaturated, and straight-chain or branched mono- to hexahydric alcohols having 12 to 22 carbon atoms, alkoxyalcohols having 12 to 22 carbon atoms, mono-, di- or tri-fatty acid esters between monobasic fatty acids having 10 to 24 carbon atoms, which may be saturated or unsaturated and straight-chain or branched, and at least one of mono- to hexahydric, saturated or unsaturated, and straight-chain or branched alcohols having 2 to 12 carbon atoms, fatty acid esters of polyalkylene oxide monoalkyl ethers, fatty acid amides having 8 to 22 carbon atoms, and aliphatic amines having 8 to 22 carbon atoms. Specific examples are lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, and butoxyethyl stearate.

The kinds and amounts of these additives serving as lubricants or surface active agents can be varied between the lower and upper layers according to the intended purpose. The following is a few examples of conceivable manipulations using additives. (1) Bleeding of fatty acid additives is suppressed by using fatty acids having different melting points between the magnetic layer and the non-magnetic layer. (2) Bleeding of ester additives is suppressed by using esters different in boiling point or polarity between the magnetic layer and the non-magnetic layer. (3) Coating stability is improved by adjusting the amount of a surface active agent. (4) The amount of the lubricant in the non-magnetic layer is increased to improve the lubricating effect.

All or part of the additives can be added at any stage of preparing the magnetic or non-magnetic coating composition. For example, the additives can be blended with the magnetic powder before kneading, or be mixed with the magnetic powder, the binder, and a solvent in the step of kneading, or be added during or after the step of dispersing or immediately before coating. The purpose of using an additive could be achieved by applying a part of, or the whole of, the additive on the magnetic layer surface either by simultaneous coating or successive coating, which depends on the purpose. A lubricant could be applied to the magnetic layer surface even after calendering or slitting, which depends on the purpose.

The thickness of the support is selected from a range of 2 to 100 $\mu$m, preferably 2 to 80 $\mu$m. In particular, the thickness of the support for computer tapes ranges 3.0 to 10.0 $\mu$m, preferably 3.0 to 8.0 $\mu$m, still preferably 3.0 to 5.5 $\mu$m.

The thickness of the magnetic layer is preferably 40 to 200 nm, still preferably 50 to 150 nm. The magnetic layer can be a single layer or a multilayer.

An undercoating layer may be provided between the support and the non-magnetic or magnetic layer to improve the adhesion. The undercoating layer usually has a thickness of 0.01 to 0.5 $\mu$m, preferably 0.02 to 0.5 $\mu$m. The material of the undercoating layer can be selected from known ones.

The backcoating layer usually has a thickness of 0.2 to 1.5 $\mu$m, preferably 0.3 to 0.8 $\mu$m.

The non-magnetic lower layer has a thickness of 0.2 to 5.0 $\mu$m, preferably 0.3 to 3.0 $\mu$m, still preferably 1.0 to 2.5 82 m.

The non-magnetic flexible support includes films made of known resins, such as polyesters (e.g., polyethylene terephthalate and polyethylene naphthalate), polycarbonate, polyamide (inclusive of totally aromatic polyamide), polyimide, polyamide-imide, and aramid. The support may previously be subjected to surface treatment, such as corona discharge treatment, plasma treatment, treatment for easy adhesion, heat treatment, and dustproof treatment.

As previously stated, the surface roughness profile of the support is freely controllable by the size and amount of the filler that is added where needed. Useful fillers include oxides and carbonates of Ca, Si, Ti, etc. and organic fine powders of acrylic resins, etc. The surface profile of the support preferably has a maximum height $S_{max}$ of 1 $\mu$m or smaller, a 10 point average roughness $S_z$ of 0.5 $\mu$m or smaller, a maximum peak-to-mean plane height $S_p$ of 0.5 $\mu$m or smaller, a maximum mean plane-to-valley depth $S_v$ of 0.5 $\mu$m or smaller, a mean plane area ratio Sr of 10% to 90%, and an average wavelength $S\lambda_a$ of 5 to 300 $\mu$m. In order to obtain desired electromagnetic characteristics and durability, the support should have formed on the surface thereof micro projections. The surface projections can be controlled usually by dispersing filler particles having an average particle size of 0.01 to 0.2 $\mu$m in the film-forming resin at a density of up to 20000 per mm$^2$ of the resulting base film. Fillers generally contain coarse grains and agglomerates, which unavoidably result in large projections. In the present invention, the number of projections of 0.273 $\mu$m or greater per 100 mm$^2$ is preferably not more than 100, still preferably 80 or fewer, particularly preferably 50 or fewer.

The support has a Young's modulus of at least 5 GPa, preferably 6 GPa or more, in both the machine direction (MD) and the transverse direction (TD). The Young's modulus in the TD is desirably larger than that in the MD. The support preferably has a thermal shrinkage of 3% or less, still preferably 1.5% or less, at 100° C.×30 minutes and of 1% or less, still preferably 0.5% or less, at 80° C.×30 minutes, a breaking strength of 5 to 100 kg/mm$^2$ (49 to 980 MPa), and an elastic modulus of 100 to 2000 kg/mm$^2$ (0.98 to 19.6 GPa). The coefficient of temperature expansion is $10^{-4}$ to $10^{-8}$/° C., preferably $10^{-5}$ to $10^{-6}$/° C., and the coefficient of humidity expansion is $10^{-4}$/RH % or less, preferably $10^{-5}$/RH % or less. It is desirable for the support to be substantially isotropic such that the differences in these thermal, dimensional, and mechanical characteristics along different in-plane directions are within 10%.

The magnetic recording medium of the invention is produced by applying coating compositions for the constituent layers, followed by drying and finishing. Methods of preparing the magnetic and non-magnetic coating compositions include at least the steps of kneading and dispersing and, if desired, the step of mixing which is provided before or after the step of kneading and/or the step of dispersing. Each step may be carried out in two or more divided stages. Any of the materials, including the magnetic powder, non-magnetic powder, binder, carbon black, abrasive, antistatic, lubricant, and solvent, can be added at the beginning of or during any step. Individual materials may be added in divided portions in two or more steps. For example, polyurethane may be added dividedly in the kneading step, the dispersing step, and a mixing step provided for adjusting the viscosity of the dispersion.

Organic solvents that can be used in the preparation of the coating compositions include ketones, such as methyl ethyl ketone, methyl isobutyl ketone, cyclohexanone, and tetrahydrofuran; alcohols, such as butanol, isobutyl alcohol, and isopropyl alcohol; and esters, such as methyl acetate, butyl acetate, isobutyl acetate, and isopropyl acetate. These organic solvents do not always need to be 100% pure and may contain impurities, such as isomers, unreacted matter, by-products, decomposition products, oxidation products, and water. The impurity content is preferably 30% or less, still preferably 10% or less. The organic solvent used in the magnetic layer and that in the non-magnetic layer are preferably the same in kind but may be different in amount. It is advisable to use a solvent with high surface tension (e.g., cyclohexanone or dioxane) in the non-magnetic lower layer to improve coating stability. Specifically, it is important that the arithmetic mean of the solvent composition of the upper layer be equal to or higher than that of the lower layer. A solvent with somewhat high polarity is preferred for improving dispersibility of powders. The solvent formulation preferably contains at least 50% of a solvent having a dielectric constant of 15 or higher. The solubility parameter of the solvent or the mixed solvent is preferably 8 to 11.

As a matter of course, known techniques relating to the manufacture of magnetic recording media can be applied as a part of the method of producing the magnetic recording medium of the invention. A magnetic recording medium having a high residual magnetic flux density (Br) can be obtained by using a kneading machine with high kneading power, such as a continuous kneader or a pressure kneader. In using a continuous kneader or a pressure kneader, the ferromagnetic powder, the whole or a part (preferably at least 30% by weight of the total binder) of the binder, and 15 to 500 parts by weight of a solvent per 100 parts by weight of the ferromagnetic powder are kneaded together. For the details of the kneading operation, reference can be made in JP-A-1-106338 and JP-A-64-79274. In the preparation of the non-magnetic coating composition for lower layer, a high specific gravity dispersing medium is used preferably. Zirconia beads are suitable.

The coating composition for non-magnetic layer and the coating composition for magnetic layer are applied to a non-magnetic flexible support either simultaneously or successively with the latter at the top. While the coating layers are wet, the coated support is subjected to smoothing and magnetic orientation.

Methods and equipment for producing the magnetic recording medium according to the invention, which has a dual layer structure, include the following:

(1) A lower layer is first applied by using a coating apparatus generally employed for a magnetic coating composition, such as a gravure coater, a roll coater, a blade coater or an extrusion coater. While the lower layer is wet, an upper layer is applied by means of an extrusion coating apparatus disclosed in JP-B-1-46186, JP-A-60-238179, and JP-A-2-265672 which is of the type in which a support is pressed while coated.

(2) A lower layer and an upper layer are applied almost simultaneously through a single coating head disclosed in JP-A-63-88080, JP-A-2-17971, and JP-A-2-265672, the coating head having two slits through which the respective coating liquids pass.

(3) A lower layer and an upper layer are applied almost simultaneously by means of an extrusion coating apparatus disclosed in JP-A-2-174965, the apparatus being equipped with a back-up roll.

In order to prevent reduction of electromagnetic characteristics due to agglomeration of magnetic particles, it is advisable to give shear to the magnetic coating composition in the coating head. The techniques taught in JP-A-62-95174 and JP-A-1-236968 are suited for shear application. The coating compositions should satisfy the viscosity requirement specified in JP-A-3-8471.

Smoothing of the coating surface can be carried out by applying a stainless steel plate onto the surface of the coated web. Smoothing can also be implemented by a method using the solid smoother disclosed in JP-B-60-57387, a method of using a rod scraper, either stationary or rotating in a direction reverse to the web running direction, with which to scrape and meter excess of the coating, or a method using a flexible sheet that is brought into planar contact with the coating layer.

Magnetic orientation of the magnetic layer is preferably conducted with a solenoid having a magnetic power of 1000 G (100 mT) or higher and a cobalt magnet having a magnetic power of 2000 G (200 mT) or higher arranged with the same poles facing to each other. In the preparation of disk media, the layer should rather be subjected to random orientation.

Calendering is carried out with rolls of heat-resistant plastics, such as epoxy resins, polyimide, polyamide and polyimide-amide. Metallic rolls are also employable. Calendering is preferably carried out at a temperature of 70° C. or higher, still preferably 80° C. or higher, under a linear pressure of 200 kg/cm (196 kN/m) or higher, still preferably 300 kg/cm (294 kN/m) or higher.

The magnetic recording medium of the invention preferably has a coefficient of friction of 0.5 or smaller, still preferably 0.3 or smaller, against SUS 420J, a surface resistivity of $10^4$ to $10^{12}$ Ω/sq, and a static potential of −500 to +500 V each on both sides thereof. The magnetic layer preferably has an elastic modulus at 0.5% elongation of 100 to 2000 kg/mm$^2$ (980 to 19600 N/mm$^2$) and a breaking strength of 10 to 70 kg/mm$^2$ (98 to 686 N/mm$^2$) in the running direction and the cross direction. The magnetic recording medium preferably has an elastic modulus of 100 to 1500 kg/mm$^2$ (980 to 14700 N/mm$^2$) , a residual elongation of 0.5% or less, and a thermal shrinkage of not more than 1%, still preferably not more than 0.5%, particularly preferably 0.1% or less, at or below 100° C. in both the running direction and the cross direction. The glass transition temperature (maximum loss elastic modulus in dynamic viscoelasticity measurement at 110 Hz) of the magnetic layer is preferably 50° to 120° C., and that of the lower layer is preferably 0° to 100° C. The loss elastic modulus preferably ranges from $1\times10^3$ to $8\times10^4$ N/cm$^2$. The loss tangent is preferably 0.2 or lower. Too high a loss tangent easily leads to a tack problem.

The residual solvent content in the magnetic layer is preferably 100 mg/m$^2$ or less, still preferably 10 mg/m$^2$ or less. The upper and the lower layers each preferably have a void of 30% by volume or less, still preferably 20% by volume or less. While a lower void is better for high output, there are cases in which a certain level of void is recommended. For instance, a relatively high void is often preferred for recording media for data storage which put weight on durability against repeated use. In the case of tape media, a squareness (SQ) in the running direction is 0.70 or greater, preferably 0.80 or greater, particularly preferably 0.90 or greater, measured in a magnetic field of 5 kOe. The squarenesses in the two directions perpendicular to the running direction are preferably 80% or smaller than that in the running direction. The magnetic layer preferably has a switching field distribution (SFD) of 0.6 or smaller.

Where the magnetic recording medium of the invention has a lower layer between the magnetic layer and the support, it is easily anticipated that the physical properties are varied between the lower and the upper layers according to the purpose. For example, the elastic modulus of the upper magnetic layer can be set relatively high to improve running durability, while that of the lower layer can be set relatively low to improve head contact. Where the magnetic recording medium has two or more magnetic layers, the physical properties of the magnetic layers can be designed with reference to conventional relevant technology. For instance, to increase the coercive force of the upper magnetic layer over that of the lower layer is proposed in many patents including JP-B-37-2218 and JP-A-58-56228. Reduction of thickness of the magnetic layer as in the present invention has made it feasible to implement recording on a magnetic layer with further increased coercivity.

The particle size of various powders used in the invention including ferromagnetic metal powder, hexagonal ferrite powder, and carbon black is measured from high-resolution transmission electron micrographs with the aid of an image analyzer. The outline of particles on micrographs is traced with the image analyzer to obtain the particle size. The particle size is represented by (1) the length of a major axis where a particle is needle-shaped, spindle-shaped or columnar (with the height greater than the maximum diameter of the base) like acicular ferromagnetic metal powder, (2) a maximum diameter of a main plane or a base where a particle is tabular or columnar (with the height smaller than the maximum diameter of the base) like hexagonal ferromagnetic powder, or (3) a circle equivalent diameter where a particle is spherical, polygonal or amorphous and has no specific major axis. The "circle equivalent diameter" is calculated from a projected area.

The average particle size of powder is an arithmetic mean calculated from the particle sizes of 500 primary particles measured as described above. The term "primary particles" denotes particles dependent of each other without agglomeration.

The term "average particle size" as used herein refers to the "average length" of particles having the shape identified in (1) above; the "average diameter" of particles having the shape identified in (2); or the "average circle equivalent diameter" of particles having the shape identified in (3). The average aspect ratio of powder is an arithmetic mean of length (major axis length)/breadth (minor axis length) ratios of particles defined in (1) above or an arithmetic mean of diameter/thickness (or height) ratios of particles defined in (2) above. The term "breadth" as used herein means the maximum length of axes perpendicular to the length (major axis) of a particle defined in (1) above. In connection to particle size distribution, the "coefficient of variation" is defined to be a percentage of standard deviation to mean.

Throughout the specification and claims, unit conversions were made as 1 kgf=9.8 N and 1 Oe $((1/4\pi)$ kA/m)=0.08 kA/m.

EXAMPLES

The present invention will now be illustrated in greater detail with reference to Examples, but it should be understood that the invention is not construed as being limited thereto. Unless otherwise noted, all the percents and parts are by weight.

| Formulation of coating composition A for backcoating layer: | |
|---|---|
| Fine carbon black (average particle size: see Table 1) | 100 parts |
| Coarse carbon black (average particle size: see Table 1) | see Table 1 |
| α-Fe$_2$O$_3$ (average particle size: 0.11 μm) (TF100 available from Toda Kogyo Corp.) | 20 parts |
| α-Al$_2$O$_3$ (average particle size: 0.20 μm) | 5 parts |

| -continued | |
|---|---|
| Formulation of coating composition A for backcoating layer: | |
| Nitrocellulose resin | 55 parts |
| Polyurethane resin | 40 parts |
| Copper oleate | 0.1 part |
| Copper phthalocyanine | 0.2 parts |

The components shown above were dispersed in a sand mill for a retention time of 120 minutes. Fifteen parts of polyisocyanate was added, and the dispersion was filtered through a filter having an average pore size of 1 μm to prepare coating compositions A (sample Nos. 1 to 6) varied in size of the fine carbon black and size and amount of coarse carbon black as shown in Table 1.

| Formulation of coating composition B for upper layer: | |
|---|---|
| Ferromagnetic metal powder (Co/Fe = 24 atom %; Al/Fe = 10 atom %; Y/Fe = 10 atom %; Hc: 2500 Oe (200 kA/m); σs: 140 A · m$^2$/kg; S$_{BET}$: 59 m$^2$/g; average length: 0.08 μm; pH: 9) | 100 parts |
| Vinyl chloride copolymer MR110 (from Zeon Corp.) | 5 parts |
| Polyester polyurethane resin (molecular weight: 35,000; neopentyl glycol/caprolactone polyol/4,4'-diphenylmethane diisocyanate (MDI) = 0.9/2.6/1 (by weight); —SO$_3$Na group content: 1 × 10$^{-4}$ eq/g) | 3 parts |
| Carbon black (average particle size: 80 nm) | 0.5 parts |
| α-Al$_2$O$_3$ (average particle size: 0.2 μm) | 5 parts |
| Phenylphosphonic acid | 3 parts |
| Stearic acid (industrial grade) | 0.5 parts |
| sec-Butyl stearate (industrial grade) | 1.5 parts |
| Cyclohexanone | 30 parts |
| Methyl ethyl ketone | 90 parts |
| Toluene | 60 parts |

The pigment, polyvinyl chloride, phenylphosphonic acid, and a half of the solvent system of the formulation shown above were kneaded in a kneader. The polyurethane resin and the rest of the respective formulations were added to the blend, followed by dispersing in a sand mill. One part of polyisocyanate (Coronate L from Nippon Polyurethane Industry Co., Ltd.) was added to the dispersion. Forty parts of a methyl ethyl ketone/cyclohexanone mixed solvent was added thereto, followed by filtration through a filter having an average pore size of 1 μm to prepare a coating composition B for upper layer.

| Formulation of coating composition C for lower layer: | |
|---|---|
| α-Fe$_2$O$_3$ (average length: 0.1 μm; S$_{BET}$: 48 m$^2$/g; pH: 8; surface coating compound: 1% Al$_2$O$_3$) | 80 parts |
| Carbon black (average particle size: 16 nm) | 20 parts |
| Vinyl chloride copolymer MR110 (from Zeon Corp.) | 10 parts |
| Polyester polyurethane resin (molecular weight: 35,000; neopentyl glycol/caprolactone polyol/MDI = 0.9/2.6/1 (by weight) ; —SO$_3$Na group content: 1 × 10$^{-4}$ eq/g) | 5 parts |
| Phenylphosphonic acid | 3 parts |
| Stearic acid | 1 part |
| sec-Butyl stearate (industrial grade) | 1 part |
| Cyclohexanone | 50 parts |
| Methyl ethyl ketone | 100 parts |
| Toluene | 50 parts |

A coating composition C for lower layer was prepared from the formulation shown above in the same manner as for the coating composition B, except for changing the amount of polyisocyanate (Coronate L) to 3 parts.

Examples 1 to 3 and Comparative Examples 1 to 3

A 6.0 μm thick polyethylene naphthalate base film was coated with the coating composition C to a dry thickness of 1.5 μm followed by the coating composition B to a dry thickness of 0.1 μm by wet-on-wet simultaneous coating.

While the coating layers were wet, the coated film was subjected to orientation treatment using a cobalt magnet having a magnetic power of 6000 Oe (480 kA/m) and a solenoid having a magnetic power of 6000 Oe (480 kA/m) and dried. The coating composition A for backcoating layer was applied to the opposite side of the base film to a dry thickness of 0.6 μm. After drying, the coated film was calendered on a 7-roll calender set at 80° C. at a speed of 200 m/min.

The coated film was heated at 70° C. for 48 hours to cure the polyisocyanate. The resulting coated film roll was slit into half-inch tape while trimming both edges off. The tape samples thus obtained were evaluated as follows. The results are shown in Table 1.

(1) Number of Projections on Backcoating Layer Surface

An AFM scan (512×512 pixels) was taken over a surface area (80 μm×80 μm) of the backcoating layer using Nanoscope III from Digital Instruments, U.S.A. The plane dividing the 3D surface profile into peaks and valleys equal in volume was regarded as a mean plane (0 height). The profile was horizontally cut along planes parallel to, and 50 nm and 75 nm above, the mean plane to count the number of peaks of 50 nm or higher and lower than 75 nm and peaks of 75 nm or higher. Three visual fields were scanned for each sample to obtain averages.

(2) Frictional Coefficient of Backcoating Layer

The tape was slid on a SUS 420J cylinder having a diameter of 4 mm and a surface roughness Ra of 10 nm at a wrap angle of 180° at a speed of 24 mm/sec with a load T1 of 10 g applied to one end of the tape. The tension (T2) of the tape was measured to calculate the coefficient of friction ($\mu$) according to the following Euler's formula:

$\mu=(1/\pi)\ln(T2/T1)$ (3) Error Rate

Measured on an LTO 2 tape drive equipped with an MR head with a read track width of 3 μm in accordance with ECMA standards.

(4) Tape Pack Condition

After the tape was run on an LTO 2 tape drive 100 passes in an environment of 50° C. and 80% RH, the cartridge was disassembled to inspect the tape pack on the reel for any irregularities. The tape pack condition was graded P (Pass: good pack with no pack compression nor step winding) or NP (No Pass: poor pack with pack compression or step winding).

TABLE 1

| | Coating Composition A | Average Particle Size of Fine Carbon Black (nm) | Coarse Carbon Black Average Particle Size (nm) | Amount (part) | Number of Projections/ 6400 μm² ≧50 nm, <75 nm | ≧75 nm | Coefficient of Friction | Error Rate (×10⁻⁷) | Tape Pack Condition |
|---|---|---|---|---|---|---|---|---|---|
| Compara. Example 1 | 1 | 13 | 270 | 4 | 630 | 180 | 0.29 | 4.2 | NP (pack compression) |
| Example 1 | 2 | 25 | 270 | 4 | 920 | 260 | 0.23 | 5.3 | P |
| Example 2 | 3 | 34 | 101 | 4 | 1244 | 400 | 0.22 | 7.5 | P |
| Example 3 | 4 | 43 | 101 | 4 | 1350 | 465 | 0.22 | 7.7 | P |
| Compara. Example 2 | 5 | 60 | 101 | 4 | 1700 | 800 | 0.21 | 95 | NP (step winding) |
| Compara. Example 3 | 6 | 43 | 270 | 10 | 1450 | 700 | 0.22 | 82 | P |

The results in Table 1 reveal that the magnetic recording tapes having a backcoating layer according to the present invention have a smaller frictional coefficient and a lower error rate and maintain a good tape pack. To the contrary, the comparative tapes are inferior in terms of at least one of frictional coefficient, error rate, and tape pack condition.

This application is based on Japanese Patent application JP 2003-312813, filed Sep. 4, 2003, the entire content of which is hereby incorporated by reference, the same as if set forth at length.

What is claimed is:

1. A magnetic recording medium comprising a backcoating layer, a support, and a magnetic layer containing ferromagnetic powder, the backcoating layer having 800 to 1500 projections of 50 nm or more and less than 75 nm in height per 6400 μm² and 600 or less projections of 75 nm or more in height per 6400 μm².

2. The magnetic recording medium according to claim 1, wherein the ferromagnetic powder is ferromagnetic metal powder having an average length of 30 to 150 nm and a coefficient of length variation of 25% or smaller.

3. The magnetic recording medium according to claim 2, wherein the ferromagnetic metal powder contains Fe, and further contains 10 to 40 atom % of Co, 2 to 20 atom % of Al, and 1 to 15 atom % of Y each based on Fe, and has a coercive force of 160 to 240 kA/m and a saturation magnetization of 80 to 160 mT.

4. The magnetic recording medium according to claim 1, wherein the ferromagnetic powder is ferromagnetic hexagonal ferrite powder having an average diameter of 5 to 40 nm and a coefficient of diameter variation of 10 to 25%.

5. The magnetic recording medium according to claim 4, wherein the ferromagnetic hexagonal ferrite powder has a coercive force of 160 to 240 kA/m and a saturation magnetization of 40 to 80 mT.

6. The magnetic recording medium according to claim 1, wherein the magnetic layer has a thickness of 40 to 200 nm.

7. The magnetic recording medium according to claim 1, wherein the magnetic layer has a thickness of 50 to 150 nm.

8. The magnetic recording medium according to claim 1, which is a magnetic tape for digital recording applied to a recording and reproduction system having a magnetoresistive head.

9. The magnetic recording medium according to claim 1, wherein the backcoating layer has 900 to 1450 projections of 50 nm or more and less than 75 nm in height per 6400 $\mu m^2$.

10. The magnetic recording medium according to claim 1, wherein the backcoating layer has 950 to 1400 projections of 50 nm or more and less than 75 nm in height per 6400 $\mu m^2$.

11. The magnetic recording medium according to claim 1, wherein the backcoating layer has 550 or less projections of 75 nm or more in height per 6400 $\mu m^2$.

12. The magnetic recording medium according to claim 1, wherein the backcoating layer has 500 or less projections of 75 nm or more in height per 6400 $\mu m^2$.

13. The magnetic recording medium according to claim 1, wherein the backcoating layer contains carbon black having an average particle size of 17 to 50 nm and carbon black having an average particle size of 75 to 300 nm.

14. The magnetic recording medium according to claim 13, wherein the carbon black having an average particle size of 17 to 50 nm and the carbon black having an average particle size of 75 to 300 nm are contained in the backcoating layer at a weight ratio of 98:2 to 75:25.

* * * * *